Figure 1:
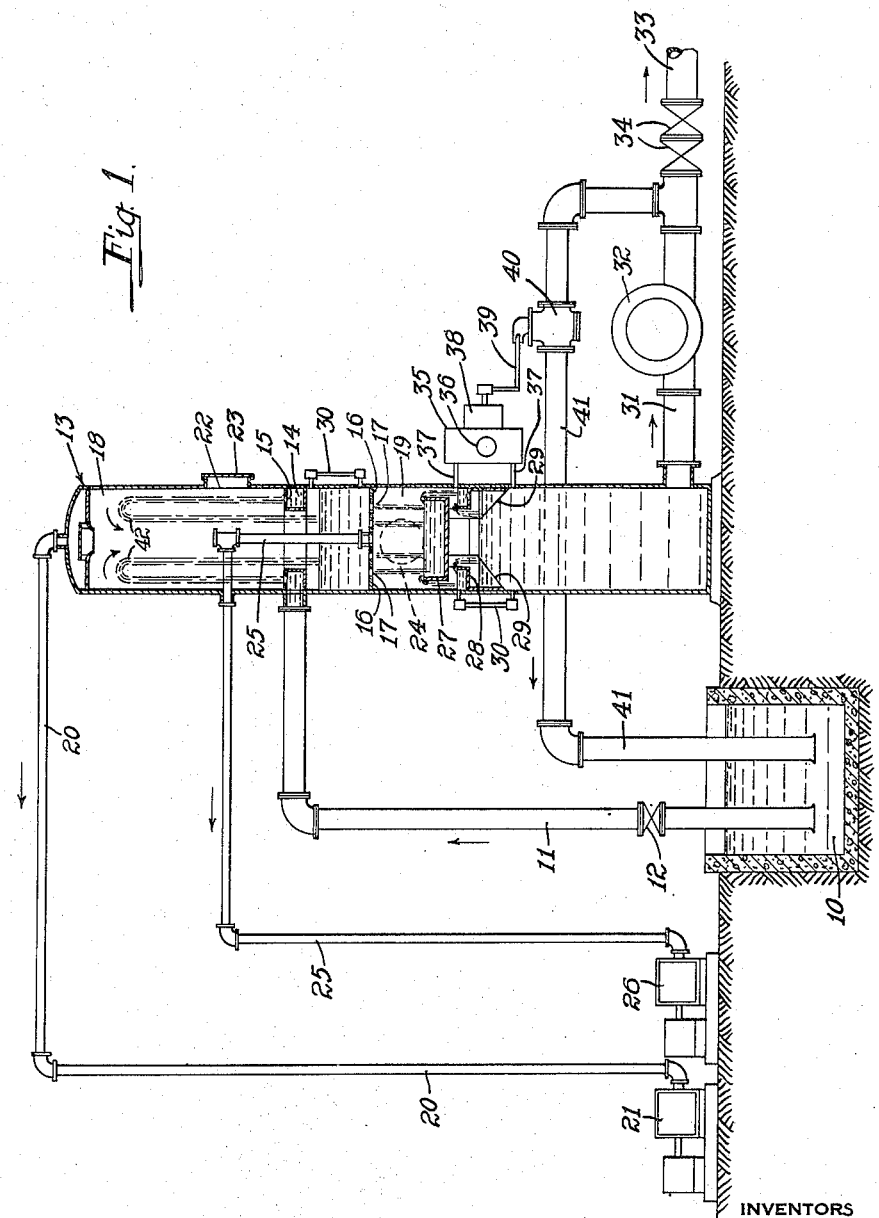

May 11, 1937.  S. T. POWELL ET AL  2,080,151
APPARATUS FOR DEGASIFYING LIQUIDS
Filed June 4, 1935  2 Sheets-Sheet 1

Patented May 11, 1937

2,080,151

UNITED STATES PATENT OFFICE 2,080,151

APPARATUS FOR DEGASIFYING LIQUIDS

Sheppard T. Powell, Baltimore, Md., and James A. Powell, Reading, Pa.

Application June 4, 1935, Serial No. 24,866

4 Claims. (Cl. 183—2.5)

Our present invention relates to the degasification of a liquid, such as water, to remove therefrom undesired gaseous constituents which cause corrosion of the pipes or mains through which the liquid flows or which otherwise adversely affect the use of the liquid.

From the standpoint of cost it is desirable to use ferrous or other metallic pipe for water mains but the deterioration of such from corrosion, to which it is readily susceptible, and the added pumping cost caused by increased friction due to incrustation of the inside walls of the pipe has limited the use of such materials to water of non-corrosive state and composition or other liquids, with very low corrosive action.

It is well known that water commonly contains gaseous constituents in dissolved or entrapped state. These gases, or certain of them such as oxygen and carbon dioxide, hydrogen sulphide and others, act as active corroding agents on the inside of the metallic pipes or mains through which the water flows. While the cause of the corrosion is thus well known and while a number of attempts have been made to minimize or eliminate such corrosion, there has been, so far as we are aware, no really effective or efficient method or apparatus for accomplishing these results. It is also well known that it is often desirable to remove dissolved or entrapped gases from liquids other than water, either to effect a separation of liquid and gaseous products or to improve the useful qualities of the liquid.

Chemical treatment is helpful in some instances but in many cases the chemical composition of the liquid is such that chemical treatment is either ineffective, excessively costly or results in other disadvantages. As an example of this, some waters can be treated with lime or silicates so that theoretically a protective film is formed on the inside of the pipe or main thus stopping further corrosion. Some waters are not susceptible to this treatment and frequently deposits or incrustations build up to such an extent that the capacity of the pipe or main is seriously impaired.

An attempt has also been made to subject the water to heat and vacuum combined to drive out gaseous constituents. While this will accomplish the desired results it is impractical, undesirable and much too expensive to heat large volumes of water. An attempt has also been made to subject the water to a vacuum in order to release the gases. This is a step in the right direction but it has been found that the large volumes of water to be handled cannot be relieved of the major portion of their undesired gaseous constituents in a satisfactory or efficient manner and moreover a vacuum pump of tremendous capacity would be required to draw off anything like the total amount of gases in the water in a single operation. Degasification can also be effected in a measure by utilizing tray type equipment wherein the water is spread over a very large area to a relatively shallow depth to reduce the hydraulic head on the gases. This is, however, very expensive in first cost and requires a large amount of space and so cannot be used for many installations.

One of the objects of our present invention is to effectively and efficiently release substantially the entire amount of gases in the water or other liquids without subjecting the same to deliberate heating.

Another object of our invention resides in successively releasing and drawing off fractions of the undesired gaseous constituents of the liquid.

An additional object of our invention resides in a two stage apparatus wherein we not only make possible a reduction in vacuum pump capacity but also effect better and more complete release of gaseous constituents since the liquid is allowed to come to substantial rest in the second stage.

A further object of our invention resides in a degasifying apparatus which can be operated at constant rating even though the degasified liquid be withdrawn at widely varying rates.

A still further object of our invention resides in subjecting liquid while broken up into fine particles to a reduced pressure, drawing off released gases and then subjecting the partially degasified liquid to a greater negative pressure while in a state of comparative rest, thus removing substantially the entire balance of the undesired gaseous constituents.

Other and further objects and advantages reside in increased simplicity and efficiency and decreased cost and in the various features of the method and apparatus to be hereinafter set forth, and such will either be pointed out in detail or will be understood by those skilled in this art.

In the accompanying drawings:—

Figure 2:
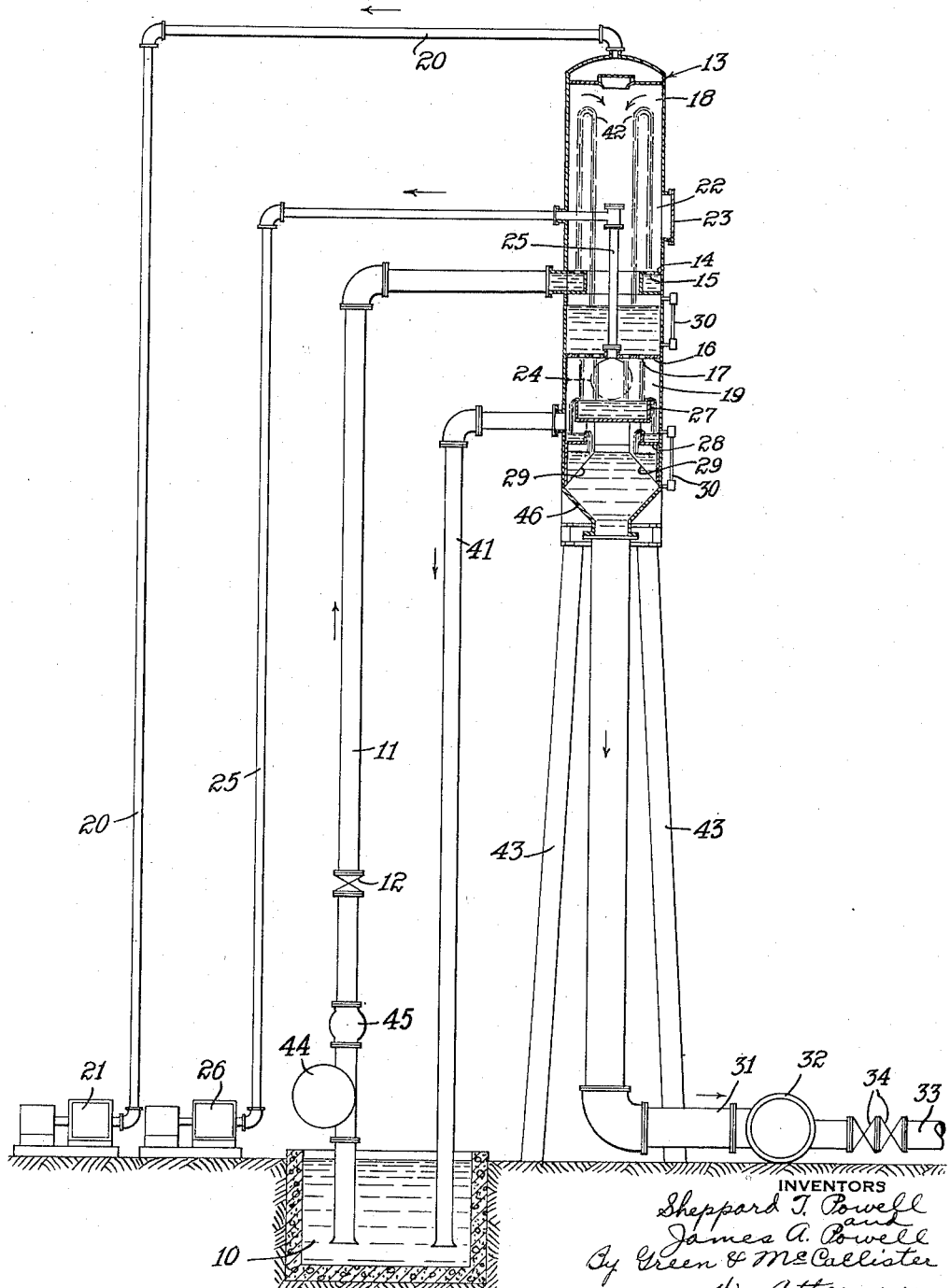

Figure 1 represents schematically a side elevational view, with parts in section, of what we term a low level jet type degasifier and Fig. 2 is a view similar to Fig. 1 of a modified form of the apparatus which we term a high level jet type degasifier.

As is well-known, the solubility and retention of gases in liquids is dependent on temperature and gas pressure, the solubility increasing with decreasing temperature and increasing pressure. It is further well-known that falling liquid entrains gases and that if the liquid is removed in a turbulent state such liquid contains more gas than would be the case were it possible to bring the water to rest and to allow the release of the entrained gas. We have discovered that a jet type degasifier, as hereinafter described, and more particularly one in which two vacuum stages are utilized, in the first of which the liquid is broken up into relatively fine particles and in the second of which the liquid is in a state of comparative rest, simply, efficiently and inexpensively accomplishes the objects and advantages set forth and at the same time obviates the defects and disadvantages outlined above.

Referring now to Fig. 1, the numeral 10 represents a source of raw water, such as a well, although it is apparent that any desirable or available water source may be utilized in connection with the present invention. Projecting into this supply of water is an intake pipe 11 in which there is suitably provided a regulating valve 12. At its other end, this pipe 11 enters a tank or tower designated as a whole by the numeral 13.

Where the intake pipe 11 enters said tank 13 there is an annular spray box 14 which is provided in its upper surface with apertures 15. Approximately across the center of the tank 13 is a plate 16 provided with perforations 17 and this plate divides the interior of the tank 13 into two chambers 18 and 19. The top of the tank is connected to a pipe 20 which leads to a vacuum pump unit 21. A man-hole 22 and a man-hole cover 23 are provided as shown in the side of the tank 13. Another manhole is indicated at 24.

Extending upwardly from the perforated plate 16 is a pipe 25 which, as shown, leads to a second vacuum pump unit 26. As shown pipe 25 communicates with chamber 19. Situated in the lower vacuum chamber 19 in the approximate position shown is a receptacle 27. Beneath this receptacle 27 is an annular receptacle 28 having relationship to the receptacle 27 which is shown in Fig. 1. These receptacles 27 and 28 are suitably mounted and supported in vacuum chamber 19 by the generally L-shaped brackets 29. Suitable water gauges 30 are provided in known manner.

From a point near the bottom of chamber 19 leads an exit pipe 31 in which is provided a suitable pump 32. This pipe 31 connects to a water main 33 by way of regulating valves 34. Leading from and connected to chamber 19 is the float box 35 containing a float diagrammatically shown by the numeral 36. This float box is provided with the pipes 37 one of which is below the water level in chamber 19 and the other of which is above such water level. Suitably associated with the float box 35 is a pilot operated power unit 38 of any suitable or desired construction the details of which form no part of the present invention. This power unit 38 is connected by piping 39 to a regulating valve 40 which operates in a manner to be explained hereinafter. This valve 40 is interposed in a by-pass pipe 41, one end of which connects into pipe 31 and the other end of which enters the source of water supply.

In operation vacuum pump unit 21 brings about a reduction in pressure in the vacuum chamber 18 and this causes water to pass up through pipe 11 where it sprays out of spray box 14 into the chamber in the form of jets in some such manner as that diagrammatically indicated by the numeral 42. The falling water accumulates to a desired level upon perforated plate 16 depending upon the capacities of the various elements involved. This accumulated water flows down through apertures 17 in perforated plate 16 into receptacle 27 in chamber 19 which, when filled, overflows into receptacle 28 which, in turn, when filled, overflows into chamber 19 and builds up a water level which is maintained substantially constant by the operation of the float box and regulating valve 40. A suitable pump may, of course, be provided in pipe 11.

It is apparent that when the water in chamber 19 exceeds a certain level, float 36 in float box 35 is raised thereby causing power unit 38 to operate and to open valve 40 to the proper extent, thereby by-passing enough water back to the source of supply 10 to maintain a constant level in chamber 19. It is apparent that pump 32 withdraws water from the bottom of the tank 13 and forces it into mains 33 under suitable pressure.

In the vacuum chamber 18, therefore, the water while in a state of unrest, e. g., as jets, is subjected to reduced pressure and as shown no heat is deliberately applied to the water. Any rise in temperature of the water is purely incidental and the water does not become raised in temperature to any material extent. As the jets of water 42 pass through chamber 18 gases are released therefrom and these are drawn or sucked off through pipe 20. The partially degasified water is then subjected to a more drastic reduction in pressure in chamber 19 which is maintained at a lower (greater-negative) pressure than chamber 18. Under these circumstances the water gives up substantially the entire balance of undesired gaseous constituents. The combined effects of the two vacuum stages and pumps produce exceptionally effective degasification which cannot be attained with one vacuum stage and one pump. This high efficiency is due to the fact that the larger fraction of the gas is removed under a low vacuum, so that its expansion due to pressure reduction is not great enough to require an inordinately large volumetric pump capacity for the first stage. Then the smaller fraction of the gas is removed under a high vacuum which, because of the small amount of gas, may be accomplished with a moderate volumetric pump capacity for the second stage.

In Fig. 2, as will be understood by the use of corresponding numerals, the tank and its parts are the same as those of Fig. 1 with the exception that in this form of our invention we do not need or make use of float box 35 and its associated parts. The tank 13 of Fig. 2 is mounted upon a suitable framework 43 so as to raise it substantially above ground level. The height of the tank is such that the water level in chamber 19 is 34 feet above the water level in the raw water supply 10. Otherwise the construction of Fig. 2 is essentially the same as Fig. 1 with the further exception that in using this high level degasifier we provide a circulating pump 44 in intake pipe 11 and in this intake pump is also provided a suitable strainer unit 45 which, of course, may also be used in connection with the low level degasifier of Fig. 1, if required. In Fig. 2 the bottom of the tank 13 is conical as designated by the numeral 46 and the discharge pipe 31 is connected thereinto as shown. The operation is the same as Fig. 1 except that the water level in chamber 19 is maintained substantially constant merely by the return of overflow pipe 41. This works as follows: Whenever the liquid withdrawn from the degasifier is less than the liquid admittted thereto, the pressure at the suction end of booster pump 32 increases, thus causing the liquid level in chamber 19 to rise. As a result, an amount of liquid equal to the difference between the amounts of liquid admitted into and withdrawn from the degasifier overflows through pipe 41 and returns to raw water supply 10, thereby providing a circulation of liquid through the degasifier irrespective of the amount of liquid withdrawn, without any mechanical or electrical controlling device for maintaining the liquid level in the degasifier.

As above pointed out the corrosion of water pipes or mains is mainly due to the presence in the water of oxygen and carbon dioxide. They act by causing oxidation of the metal. There are, however, sometimes present in water other gases such as nitrogen and hydrogen sulphide, and, in some cases, depending upon the locality or source of water, still other gases. The present method and apparatus will remove from water, all gases whose concentration in solution is a function of the pressure of the gas in contact with the solution, and thus provides an exceptionally good water or other liquid which has been found to produce no corrosion or say, at most only a negligible amount of corrosion of the pipes or mains. The present invention is, however, not limited to the degasification of water but may be utilized to remove gases from any liquid which contains undesired gaseous constituents for any purpose whatever, e. g., where it is desired to prevent or minimize corrosion of the pipe or mains through which the liquid flows or to obtain gas-free water or liquids for other industrial uses. It is useful, for example, in removing gases from water used for ice making where the presence of the gases interferes with the manufacture of clear ice or results in the production of ice which is not of good quality due to the gaseous inclusions. The present invention is also adaptable for the treating of water used for generating steam and in such cases the degasified water does not produce such corrosion and stoppage of the boiler equipment as is commonly caused by dissolved gases, and thereby enables the steam generating equipment to operate at maximum efficiency. The invention is applicable for still other purposes which will be appreciated by those requiring water or other liquids free from gaseous constituents.

The above is intended primarily in an illustrative manner as we do not deem ourselves restricted thereto except as required by the subjoined claims. Various additions, modifications, omissions and variations may be resorted to without departing from the scope and purpose of the present invention.

We are not limited to the use of two vacuum stages but, if desired or required, we may provide three, four or more stages each successively at a lower pressure, preferably. In case of very badly gasified liquid such may be resorted to for more complete results. Ordinarily, however, we find that two stages are sufficient for excellent results.

What we claim as new and desire to secure by Letters Patent is:—

1. A degasifier comprising a tower, a horizontal perforated plate in said tower dividing the tower into an upper and a lower chamber, means for creating and maintaining in each chamber a partial vacuum in such manner that the pressure in the lower chamber is less than that in the upper chamber, an annular spray box mounted in the upper chamber nearer the bottom than the top thereof, an intake pipe to supply raw liquid to said spray box, an offtake pipe connected to the top of said upper chamber and communicating with said vacuum producing means, liquid receiving receptacles in the lower chamber near the top thereof for receiving liquid passing through said perforated plate, an offtake pipe communicating with the top of the lower chamber and communicating with said vacuum producing means and an exit pipe leading from the bottom of the lower chamber to liquid supply mains.

2. A degasifier comprising a tower, a horizontal perforated plate in said tower dividing the tower into an upper and a lower chamber, means for creating and maintaining in each chamber a partial vacuum in such manner that the pressure in the lower chamber is less than that in the upper chamber, a spray box mounted in the upper chamber nearer the bottom than the top thereof, an intake pipe to supply raw liquid to said spray box, an offtake pipe connected to the top of said upper chamber, liquid receiving receptacles in the lower chamber near the top thereof for receiving liquid passing through said perforated plate, an offtake pipe communicating with the top of the lower chamber, means for maintaining a constant level in the lower chamber irrespective of the rate of withdrawal of liquid therefrom and means for withdrawing degasified liquid from the bottom of the lower chamber.

3. An apparatus for degasifying liquids comprising a tank, a perforated partition plate transversely mounted in said tank and sub-dividing the tank into an upper chamber and a lower chamber, a vacuum producing apparatus connected by suitable piping to the top of said upper chamber, a second vacuum producing apparatus connected by suitable piping to the top of said lower chamber, the upper chamber communicating with the lower chamber through the said partition plate, means for introducing undegasified liquid into said first chamber nearer the bottom than the top thereof in such manner that the liquid first progresses upwardly as a jet and then falls freely through the chamber, a supply of partially degasified liquid accumulating on said partition plate and flowing at a rate determined by the sizes of the apertures in such partition plate into the lower chamber, wherein the degasification of the liquid is completed, means for introducing the liquid into the lower chamber in a relative state of quiescence as compared to the liquid in the upper chamber, and means for preventing the liquid level in the lower chamber from exceeding a predetermined maximum.

4. An apparatus for degasifying liquids and thereby rendering them non-corrosive which comprises a tank, a perforated partition plate transversely disposed in said tank and sub-dividing the tank into an upper chamber and a lower chamber, means for creating a partial vacuum in the upper chamber, means for creating a greater vacuum in the lower chamber, an annular spray box mounted in the upper chamber nearer the bottom than the top of said chamber, means for introducing undegasified liquid into said first chamber through said spray box in such manner that the liquid first passes upwardly in the form of a jet and then falls freely through the chamber accumulating on said partition plate, means for gravitationally flowing partially degasified liquid which has accumulated on said partition plate through the perforations of said partition plate to said lower chamber in such manner that the liquid is in a state of quiescence as compared to the liquid as it is introduced into the upper chamber, the degasification of the liquid being completed in the lower chamber, means for preventing the liquid in the lower chamber from exceeding a predetermined level, means for returning any such excess to a source of supply and means for flowing degasified liquid into a distributing system.

SHEPPARD T. POWELL.
JAMES A. POWELL.